(12) United States Patent
Guo et al.

(10) Patent No.: US 11,483,421 B2
(45) Date of Patent: Oct. 25, 2022

(54) TERMINAL DEVICE

(71) Applicant: Beijing Xiaomi Mobile Software Co., Ltd., Beijing (CN)

(72) Inventors: Xiaoying Guo, Beijing (CN); Linchuan Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/928,528

(22) Filed: Jul. 14, 2020

(65) Prior Publication Data

US 2021/0250429 A1 Aug. 12, 2021

(30) Foreign Application Priority Data

Feb. 12, 2020 (CN) .......................... 202010089366.6

(51) Int. Cl.
*H04M 1/02* (2006.01)
*H01Q 1/24* (2006.01)
*H04B 1/44* (2006.01)
*H04B 1/56* (2006.01)

(52) U.S. Cl.
CPC ............ *H04M 1/026* (2013.01); *H01Q 1/243* (2013.01); *H04B 1/44* (2013.01); *H04B 1/56* (2013.01)

(58) Field of Classification Search
CPC ........ H04M 1/00; H04M 1/0026; H04M 1/02; H04M 1/0202; H04M 1/026; H01Q 1/241; H01Q 1/242; H01Q 1/38; H01Q 1/2283; H01Q 21/28; H01Q 1/24; H01Q 1/243; H04B 1/38; H04B 1/40; H04B 1/454; H04B 1/56; H04B 1/3827; H04B 1/3833; H04B 1/44
See application file for complete search history.

(56) References Cited

U.S. PATENT DOCUMENTS

| | | | | |
|---|---|---|---|---|
| 8,466,839 B2* | 6/2013 | Schlub | ................... | H01Q 1/243 343/702 |
| 8,493,274 B2* | 7/2013 | Raura | ................... | H01Q 1/243 343/767 |
| 9,887,454 B2* | 2/2018 | Ito | ......................... | H01Q 1/241 |
| 9,937,526 B2* | 4/2018 | Shiu | ....................... | H01Q 1/243 |
| 10,560,557 B2* | 2/2020 | Hwang | ................ | H04M 1/026 |
| 10,601,113 B2* | 3/2020 | Bae | ..................... | H04M 1/0266 |

(Continued)

FOREIGN PATENT DOCUMENTS

| | | |
|---|---|---|
| CN | 101958454 A | 1/2011 |
| CN | 101958455 A | 1/2011 |

(Continued)

OTHER PUBLICATIONS

Extended European Search Report in European Application No. 20188595.1 dated Jan. 20, 2021.

(Continued)

*Primary Examiner* — Quochien B Vuong

(74) *Attorney, Agent, or Firm* — Finnegan, Henderson, Farabow, Garrett & Dunner, L.L.P.

(57) ABSTRACT

A terminal device may include: a housing; a first radiator disposed in the housing and configured to receive and transmit wireless signals; and a conducting layer disposed on an inner surface of a back shell of the housing and coupled with the first radiator to form a second radiator which is configured to receive and transmit the wireless signals.

8 Claims, 10 Drawing Sheets

(56) References Cited

U.S. PATENT DOCUMENTS

| | | | |
|---|---|---|---|
| 10,741,932 B2 * | 8/2020 | Thai | H01Q 21/28 |
| 10,833,403 B2 * | 11/2020 | Kim | H01Q 1/243 |
| 10,944,153 B1 * | 3/2021 | Yarga | H01Q 1/243 |
| 2007/0296638 A1 | 12/2007 | Kim et al. | |
| 2011/0012794 A1 | 1/2011 | Schlub et al. | |
| 2020/0002101 A1 | 1/2020 | Ou et al. | |
| 2020/0313299 A1 | 10/2020 | Jia | |

FOREIGN PATENT DOCUMENTS

| | | |
|---|---|---|
| CN | 110048224 A | 7/2019 |
| CN | 110635242 A | 12/2019 |
| EP | 3726648 A1 | 10/2020 |
| JP | H 8-195609 A | 7/1996 |
| JP | 2003-198410 A | 7/2003 |
| KR | 10-2009-0131429 A | 12/2009 |
| KR | 10-2012-0044999 A | 5/2012 |
| KR | 20140139536 A | 12/2014 |
| KR | 10-2016-0022074 A | 2/2016 |
| KR | 20170055351 A | 5/2017 |
| KR | 20170098401 A | 8/2017 |
| KR | 20190027625 A | 3/2019 |

OTHER PUBLICATIONS

Notice of Reasons for Refusal dated Oct. 5, 2021, from the Japanese Patent Office in counterpart Japanese Application No. 2020-126057.
Notification of Reason for Refusal dated Dec. 1, 2021, from the Korean Intellectual Property Office issued in counterpart Korean Application No. 10-2020-0085909.
First Office Action of Chinese Application No. 202010089366.6, dated May 19, 2022.

* cited by examiner

TERMINAL DEVICE

CROSS-REFERENCE TO RELATED APPLICATION

This application is based on and claims priority to Chinese Patent Application No. 202010089366.6 filed on Feb. 12, 2020, the content of which is hereby incorporated by reference in its entirety.

TECHNICAL FIELD

The disclosure relates to the technical field of communication, and particularly to a terminal device.

BACKGROUND

With the rapid development of communication technology and demands for science and technology, the number of antennas of a terminal device increases. For example, specifications in the 5-Generation wireless communication technology (5G) have been introduced to antennas of terminal devices, such as mobile phones, to achieve high-speed communication. However, mobile phones are developed to have a small headroom and a high screen ratio, and thus the available space for antennas is limited, and antenna performance may be degraded.

SUMMARY

According to embodiments of the disclosure, a terminal device may include: a housing; a first radiator, disposed in the housing and configured to receive and transmit wireless signals; and a conducting layer, disposed on an inner surface of a back shell of the housing, and coupled with the first radiator to form a second radiator which is configured to receive and transmit the wireless signals.

It is to be understood that the above general description and the following detailed description are exemplary and explanatory only, and are not intended to limit the disclosure.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure.

DETAILED DESCRIPTION

Exemplary embodiments will be described in detail below, examples of which are illustrated in the accompanying drawings. When the following description refers to the accompanying drawings, the same numbers in different drawings represent the same or similar elements unless otherwise indicated. The implementations described in the following exemplary embodiments do not represent all implementations consistent with the disclosure. Instead, they are merely examples of devices and methods consistent with some aspects of the disclosure as recited in the appended claims.

Terms used in the present disclosure are for describing exemplary embodiments only, and are not intended to limit the present disclosure. For example, although the terms "first," "second," "third," etc. may be used to describe various information in the present disclosure, the information should not be limited to these terms. The terms are only used to distinguish the same type of information from each other. For example, without departing from the scope of the present disclosure, first information may also be referred to as second information, and similarly, the second information may also be referred to as first information.

Figure 1:
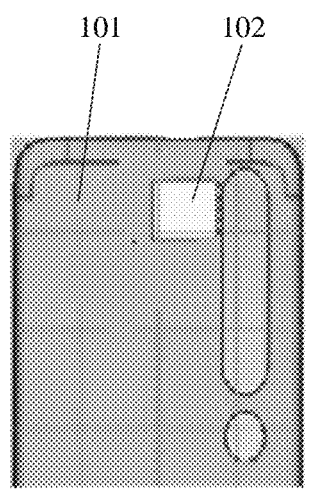
FIG. 1 is a schematic diagram of a terminal device according to an exemplary embodiment.

FIG. 1 is a schematic diagram of a terminal device according to an exemplary embodiment. The terminal device may include: a housing; a first radiator (e.g., a first radiator 103 in FIG. 9), disposed in the housing and configured to receive and transmit wireless signals; and a conducting layer 102, disposed on an inner surface of a back shell 101 of the housing, and coupled with the first radiator to form a second radiator that is configured to receive and transmit wireless signals.

The terminal device may be a wearable electronic device or a mobile terminal. The mobile terminal may be a mobile phone, a notebook computer, a tablet computer, etc., and the wearable electronic device may be a smart watch or the like, which is not limited in the embodiments of the disclosure.

The back shell 101 of the housing may be, but is not limited to, a shell made of materials such as glass or plastic.

The housing may include a middle frame (e.g., a middle frame 105 in FIG. 9) bearing various functional modules in the terminal device and a side frame (e.g., a middle frame 104 in FIG. 5) surrounding the middle frame. The first radiator may be disposed on the middle frame of the terminal device or on the side frame of the terminal device, which is not limited in the embodiments of the disclosure.

In some embodiments, the first radiator may be a radiator formed by a laser direct irradiation molding process or a flexible circuit board process.

The first radiator may be made of a conducting material and may convert electric signals into wireless signals. The first radiator may be configured to receive and transmit wireless signals of various frequency bands. For example, the first radiator may receive and transmit wireless signals of B1, B3 and B39 frequency bands, and may also receive and transmit wireless signals of a WiFi 2.4 GHz or 5 GHz frequency band.

In some embodiments, the first radiator may be a radiator with a Multi-input Multi-output (MIMO) antenna, such as a radiator with a 4*4 MIMO antenna.

The terminal device may include the conducting layer 102 disposed on the inner surface of the back shell 101 of the housing.

In some embodiments, the conducting layer 102 may be formed by printing a conducting material on the back shell 101 of the housing through a jig.

In some embodiments, the conducting material may include silver paste or copper.

In some embodiments, the conducting material may include alloy materials or conducting plastics.

In the embodiments of the disclosure, the conducting layer may be coupled with the first radiator to form the second radiator. It is to be noted that the conducting layer and the first radiator may be disposed at an interval. The position of the conducting layer on the back shell may be set according to the position of the first radiator in the terminal device.

For example, when the first radiator is disposed at position A, the conducting layer may be disposed at a position in which the position A is projected to the back shell. Therefore, the spacing distance between the first radiator and the conducting layer may be reduced, and thus, the first radiator and the conducting layer can implement energy coupling of maximum efficiency.

When the first radiator radiates wireless signals of one frequency band, the size of the conducting layer may be set according to the size of the first radiator. For example, the size of the conducting layer may be set to be greater than or equal to the size of the first radiator. Therefore, the conducting layer may be coupled with an alternating magnetic field generated by the first radiator to the maximum extent, so as to improve the coupling efficiency between the conducting layer and the first radiator. In some embodiments, the process of coupling the conducting layer with the first radiator may include: when the second radiator converts an alternating current into an alternating magnetic field, the conducting layer may generate an alternating current under the action of the alternating magnetic field, and an alternating magnetic field may be generated based on the alternating current, so that the conducting layer may receive and transmit wireless signals together with the first radiator.

Therefore, the second radiator formed by the first radiator and the conducting layer is configured to receive and transmit wireless signals. Compared with the traditional manner of receiving and transmitting wireless signals by using the first radiator only, the manner of receiving and transmitting wireless signals by using the first radiator and the conducting layer together in the embodiments of the disclosure can not only increase the receiving and transmitting power of the wireless signals, but also increase the radiation area of the wireless signals, thereby improving the receiving and transmitting efficiency and communication quality of the wireless signals. Compared with the traditional arrangement of the conducting layer on a middle frame in a terminal device, the arrangement of the conducting layer on the back shell can reduce the space occupied by the conducting layer in the terminal device, thereby improving the performance of an antenna in a limited space and meeting the development trend of small headroom of the antenna.

Figure 2:
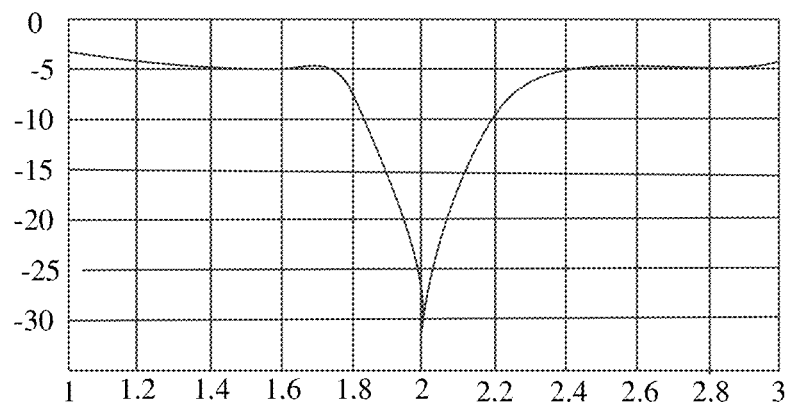
FIG. 2 is a schematic diagram of return loss of a terminal device without a conducting layer according to an exemplary embodiment.
Figure 3:
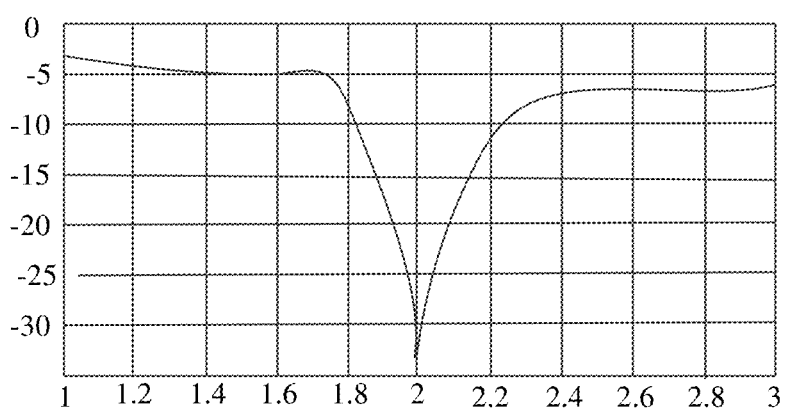
FIG. 3 is a schematic diagram of return loss of a terminal device with a conducting layer according to an exemplary embodiment.

FIG. 2 is a schematic diagram of return loss of a terminal device without a conducting layer on a back shell. FIG. 3 is a schematic diagram of return loss of a terminal device with a conducting layer on a back shell. The horizontal coordinate represents frequency, and the unit is GHz. The longitudinal coordinate represents return loss, and the unit is dB. As can be seen from FIG. 2 and FIG. 3, the return loss of the terminal device with the conducting layer is smaller than the return loss of the terminal device without the conducting layer. Therefore, it is verified that the arrangement of the conducting layer on the back shell of the terminal device in the embodiments of the disclosure can reduce the return loss.

Figure 4:
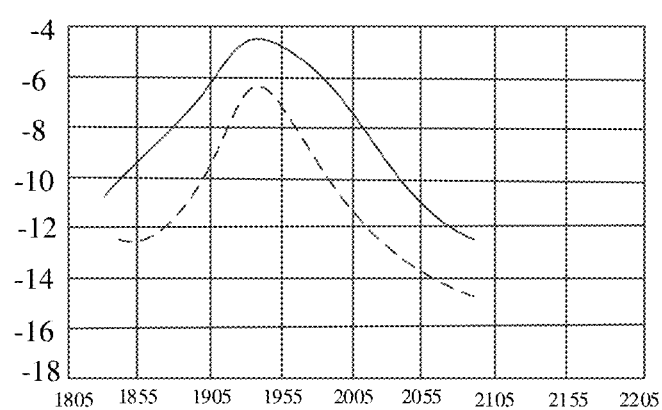
FIG. 4 is a schematic diagram of comparison of antenna receiving and transmitting efficiency of a terminal device according to an exemplary embodiment.

FIG. 4 is a schematic diagram of comparison of antenna receiving and transmitting efficiency between a terminal device with a conducting layer and a terminal device without a conducting layer. As shown in FIG. 4, a solid line corresponds to the terminal device being provided with a conducting layer, and a dotted line corresponds to the terminal device not being provided with a conducting layer. The horizontal coordinate represents frequency, and the unit is MHz. The longitudinal coordinate represents efficiency, and the unit is dB. It is verified that the antenna receiving and transmitting efficiency of the terminal device with the conducting layer is significantly higher than the antenna receiving and transmitting efficiency of the terminal device without the conducting layer, and about 2 dB wireless receiving and transmitting efficiency may be increased.

In some embodiments, a projection of the first radiator to the back shell of the housing may at least partially overlap a region in which the conducting layer is disposed. In other words, at least part of the conducting layer is directly opposite to the first radiator, which may shorten the distance between the conducting layer and the first radiator to the maximum extent, so that the first radiator may couple electromagnetic energy to the conducting layer better, and thus the efficiency of the second radiator for receiving and transmitting wireless signals is improved.

In the embodiments, the situation that the projection of the first radiator to the back shell of the housing at least partially overlaps the region in which the conducting layer is disposed may include: the projection of the first radiator to the back shell completely overlaps the region in which the conducting layer is disposed, or the projection of the first radiator to the back shell partially overlaps the region in which the conducting layer is disposed.

When the projection of the first radiator to the back shell completely overlaps the region in which the conducting layer is disposed, the area of the first radiator is equal to the area of the conducting layer. When the projection of the first radiator to the back shell partially overlaps the region in which the conducting layer is disposed, the area of the first radiator may be less than or greater than the area of the second radiator, which is not limited in the embodiments of the disclosure.

In some embodiments, the conducting layer may include at least two conducting regions disposed at intervals.

The first radiator may include at least two radiation regions configured to receive and transmit at least two frequency bands.

Each of the at least two radiation regions in the first radiator may be respectively coupled with a conducting region corresponding to each of the at least two radiation regions to receive and transmit wireless signals of the at least two frequency bands.

In other words, each of the at least two radiation regions may correspond to a conducting region. When at least two radiation regions of the first radiator receive and transmit wireless signals of at least two different frequency bands, each of the at least two radiation regions may be respectively coupled with the corresponding conducting region. Therefore, in the embodiments, by coupling radiation regions with different conducting regions on the back shell, the efficiency and communication quality of the terminal device for receiving and transmitting wireless signals of two different frequency bands may be improved.

In some embodiments, the radiation regions in the first radiator may partially overlap.

In some embodiments, the number of the conducting regions in the conducting layer may be set according to the number of the radiation regions for radiating different frequency bands in the first radiator. For example, when the first radiator includes three radiation regions for radiating three frequency bands, three conducting regions may be set; and when the first radiator includes two radiation regions for radiating two frequency bands, two conducting regions may be set. The number of the conducting regions is not limited in the embodiments of the disclosure.

Figure 5:
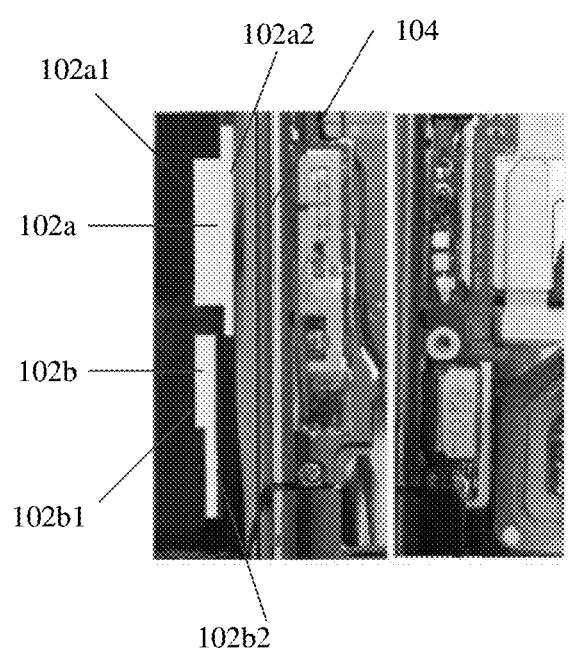
FIG. 5 is a schematic diagram of a terminal device according to an exemplary embodiment.

In some embodiments, as shown in FIG. 5, the at least two conducting regions include a first conducting region 102a and a second conducting region 102b. Correspondingly, the at least two radiation regions may include a first radiation region and a second radiation region. A projection of the first radiation region to the back shell of the housing may partially overlap the first conducting region 102a. A projection of the second radiation region to the back shell of the housing may partially overlap the second conducting region 102b.

In other words, in the embodiments, the first conducting region and the first radiator may be coupled to receive and transmit wireless signals of a first frequency band. The second conducting region and the first radiator may be coupled to receive and transmit wireless signals of a second frequency band.

A center frequency of the first frequency band may be different from a center frequency of the second frequency band. For example, the center frequency of the first frequency band may be 5 GHz and the center frequency of the second frequency band may be 2.4 GHz, or, the center frequency of the first frequency band may be the center frequency of a frequency band B1 and the center frequency of the second frequency band may be the center frequency of a frequency band B3, which is not limited in the embodiments of the disclosure.

The projection of the first radiator to the back shell of the housing may at least partially overlap the region in which the conducting layer is disposed. Correspondingly, when the positions of the first conducting region and the second conducting region are set on the back shell of the housing, it is needed to enable the projection of the first radiator to the back shell to have an overlap with the first conducting region, and enable the projection of the first radiator to the back shell to also have an overlap with the second conducting region. Therefore, when wireless signals are received and transmitted, the first conducting region and the second conducting region can be better coupled with the first radiation region and the second radiation region respectively.

Figure 6:
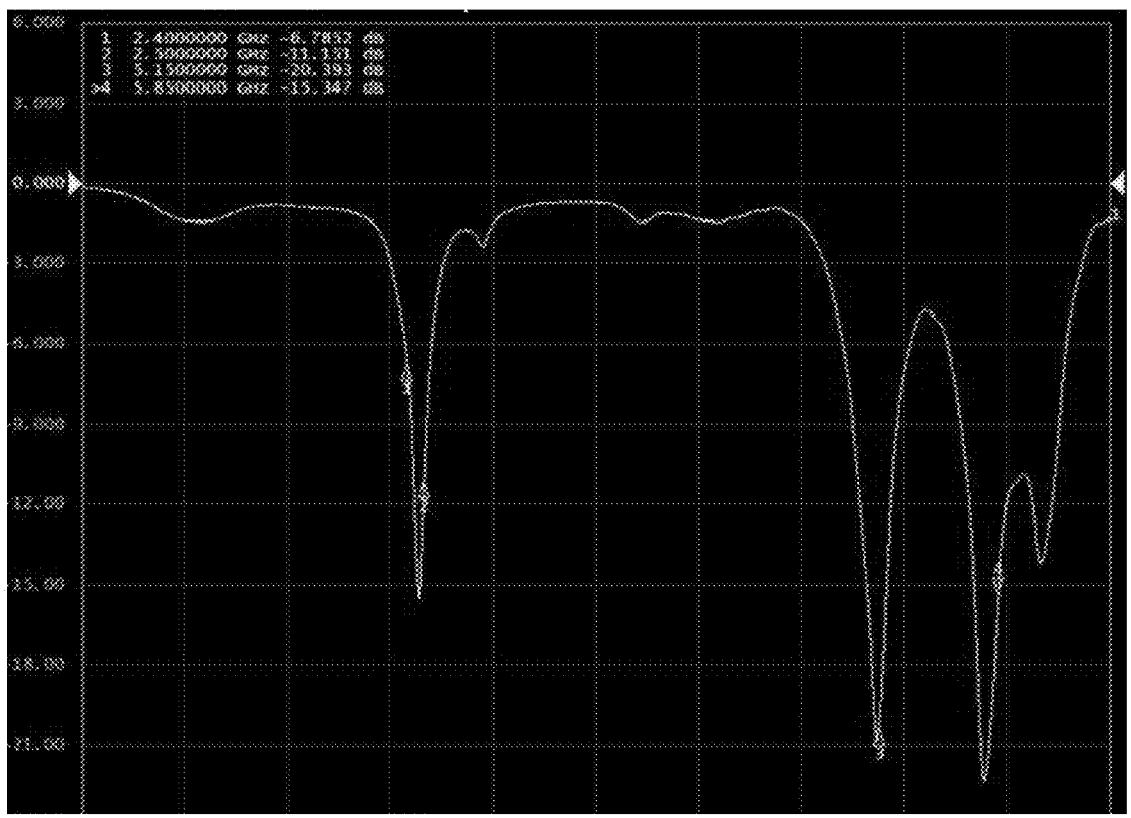
FIG. 6 is a schematic diagram of return loss of a terminal device with two conducting regions according to an exemplary embodiment.

FIG. 6 is a schematic diagram of return loss of a terminal device with two conducting regions, according to an exemplary embodiment. As shown in FIG. 6, the horizontal coordinate represents frequency, and the longitudinal coordinate represents return loss. The return loss corresponding to 2.4 GHz wireless signals received and transmitted by the terminal device is −6.7852 dB. The return loss corresponding to 2.5 GHz wireless signals received and transmitted by the terminal device is −11.151 dB. The return loss corresponding to 5.15 GHz wireless signals received and transmitted by the terminal device is −20.393 dB. The return loss corresponding to 5.85 GHz wireless signals received and transmitted by the terminal device is −15.347 dB.

Figure 7A:
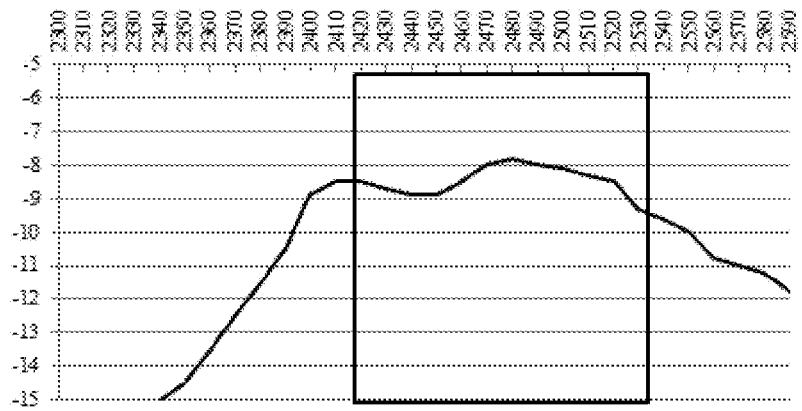
FIG. 7A is a schematic diagram of the receiving and transmitting efficiency of antennas of a terminal device with two conducting regions according to an exemplary embodiment.
Figure 7B:
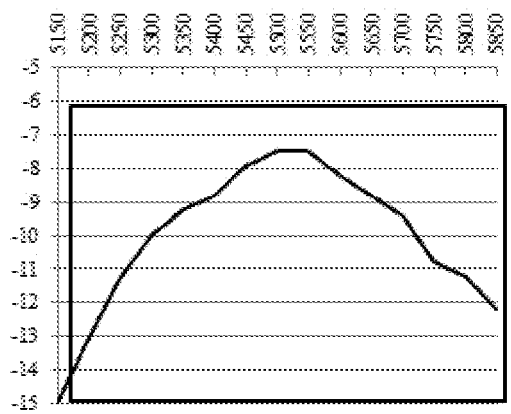
FIG. 7B is a schematic diagram of antenna receiving and transmitting efficiency of a terminal device with two conducting regions according to an exemplary embodiment.

FIG. 7A and FIG. 7B are schematic diagrams of the efficiency of a terminal device with two conducting regions in receiving and transmitting of wireless signals, according to an exemplary embodiment. As shown in FIG. 7A and FIG. 7B, the horizontal coordinate represents frequency, and the longitudinal coordinate represents the efficiency of receiving and transmitting wireless signals. When the terminal device receives and transmits wireless signals having a 2.4 GHz center frequency, the corresponding efficiency of receiving and transmitting wireless signals is close to −7.8 dB. When the terminal device receives and transmits wireless signals having a 5 GHz center frequency, the corresponding efficiency of receiving and transmitting wireless signals is close to −7.5 dB.

Figure 8:
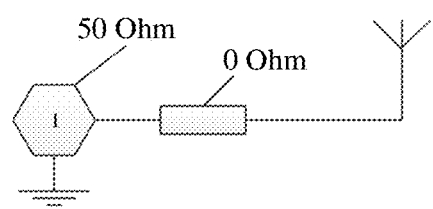
FIG. 8 is a schematic diagram of a matching circuit of a terminal device according to an exemplary embodiment.

FIG. 8 is a schematic diagram of a matching circuit for receiving and transmitting wireless signals by a first radiator of a terminal device, according to an exemplary embodiment. As shown in FIG. 8, the matching impedance corresponding to the second radiator formed by the first conducting region, the second conducting region and the first radiator may enable the second radiator to receive and transmit wireless signals, and no additional matching capacitors, matching resistors or matching inductors are needed to optimize the matching circuit, thereby improving the performance of reception and transmission of wireless signals.

In some embodiments, as shown in FIG. 5, the housing may include a side frame 104.

The first conducting region 102a may include a first side 102a2 close to the side frame 104 and a second side 102a1 away from the side frame 104. The length of the first side 102a2 may be greater than the length of the second side 102a1.

The second conducting region 102b may include a third side 102b2 close to the side frame 104 and a fourth side 102b1 away from the side frame 104. The length of the third side 102b2 may be greater than the length of the fourth side 102b1.

In the embodiments, the electromagnetic interference received by the region away from the side frame may be greater than the electromagnetic interference received by the region close to the side frame. Therefore, the length of the first side close to the side frame may be set to be greater than the length of the second side away from the side frame, and the length of the third side close to the side frame may be set to be greater than the length of the fourth side away from the side frame. Therefore, the region close to the side frame in the first conducting region and the region close to the side frame in the second conducting region may be relatively increased, so as to reduce the impact of electromagnetic interference on the first conducting region and the second conducting region, and improve the performance of reception and transmission of wireless signals.

In the embodiments, the first side and the second side may be sides parallel to the side frame, and the third side and the fourth side may also be sides parallel to the side frame. Therefore, the layout of the conducting layer on the back shell of the housing may be regular.

When the positions of the first conducting region and the second conducting region are set on the back shell, the distance between the first side and the side frame may be less than the distance between the second side and the side frame. In other words, the first side may be closer to the side frame than the second side. Therefore, the first conducting region may be away from electromagnetic interference when receiving and transmitting wireless signals of high frequency bands, so as to improve the performance of receiving and transmitting of wireless signals of high frequency bands.

In the embodiments, when the first side is disposed, the first side may be extended away from a metal component in the terminal device relative to the second side, so that the length of the first side is greater than the length of the second side. Therefore, the area of the first conducting region in an antenna clearance zone may be increased by increasing the length of the first side, and thus, radiation may be introduced into the clearance zone to improve the performance of reception and transmission of wireless signals.

When the third side is disposed, the third side may also be extended away from a metal component in the terminal device relative to the fourth side, so that the length of the third side is greater than the length of the fourth side. Therefore, the area of the second conducting region in an antenna clearance zone may be increased by increasing the length of the third side, and thus, radiation may be introduced into the clearance zone to improve the performance of reception and transmission of wireless signals.

The size of the first conducting region and the size of the second conducting region may be set according to the actual layout of each of metal components of the terminal device. For example, when the maximum length of the long edge of the first radiator is 26 mm and the maximum length of the short edge is 5 mm, the length of the first side in the first conducting region may be set to 26 mm, and the distance between the first side and the second side may be set to 5 mm; or the length of the first side in the first conducting region may be set to 23 mm, and the distance between the first side and the second side may be set to 2.5 mm.

In the embodiments of the disclosure, the shape of the first conducting region and the shape of the second conducting region may also be set according to the actual layout of each of metal components of the terminal device. Accordingly, the shape setting of the first conducting region and the second conducting region may be restricted by each of metal components of the terminal device. Referring to FIG. 5, when no metal component is disposed in the first conducting region in a direction D, the first side in the first conducting region may be extended to the direction D, so that the shape of the first conducting region can be protruded to the direction D. When no metal component is disposed in the second conducting region in a direction deviating from the direction D, the third side in the second conducting region may be extended to the direction deviating from the direction D, so that the shape of the second conducting region can be protruded to the direction deviating from the direction D.

The shapes of the first conducting region and the second conducting region may be polygons whose adjacent sides are perpendicular to each other, or may be irregular shapes composed of curves.

In some embodiments, the first conducting region may be T-shaped, and the second conducting region may be L-shaped.

In some embodiments, when the first conducting region is T-shaped, the sizes of the protruded parts at two opposite sides of the first conducting region may be equal or different, which is not limited in the embodiments of the disclosure.

In some embodiments, each of the first conducting region and the second conducting region may be a trapezoid, and the trapezoid may include an isosceles trapezoid or a right trapezoid.

In some embodiments, the housing may include a side frame. The side frame may include a long edge and a short edge which are adjacent, and the length of the long edge may be greater than the length of the short edge. The distance between the conducting layer and the long edge may be less than the distance between the conducting layer and the short edge. When the position of the conducting layer is set, the conducting layer may be close to the long edge of the side frame, and the conducting layer may also be close to the short edge of the side frame. Therefore, the manner of setting the conducting layer is flexible.

Figure 9:
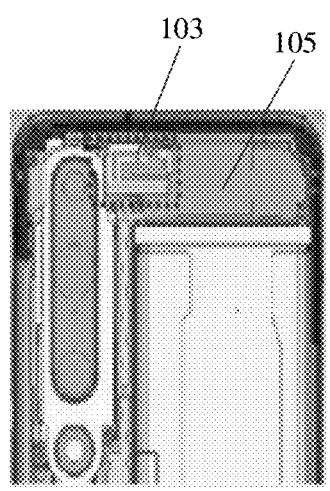
FIG. 9 is a schematic diagram of a terminal device according to an exemplary embodiment.

In some embodiments, as shown in FIG. 9, the terminal device may include: the middle frame 105 disposed in the housing; and the first radiator 103 disposed on the middle frame 105 and located between the middle frame 105 and the conducting layer 102 (FIG. 1).

The middle frame 105 may have multiple spaces for containing all functional modules of the terminal device. For example, the middle frame 105 may have a containing space for containing a power supply module in the terminal device, and the power supply module is configured to provide electric signals. The middle frame 105 may have a containing space for containing an image collection module in the terminal device, and the image collection module is configured to collect images. The middle frame 105 may have a containing space for containing an audio output module in the terminal device, and the audio output module is configured to output audio signals.

The first radiator 103 may be disposed on the middle frame 105 and located between the middle frame 105 and the conducting layer 102 (FIG. 1). In other words, the first radiator 103 may be disposed on an outer surface of the middle frame 105 facing the conducting layer 102. In this way, there is no other device between the first radiator and the conducting layer, so that the electromagnetic energy on the first radiator may be coupled to the conducting layer better.

Figure 10:
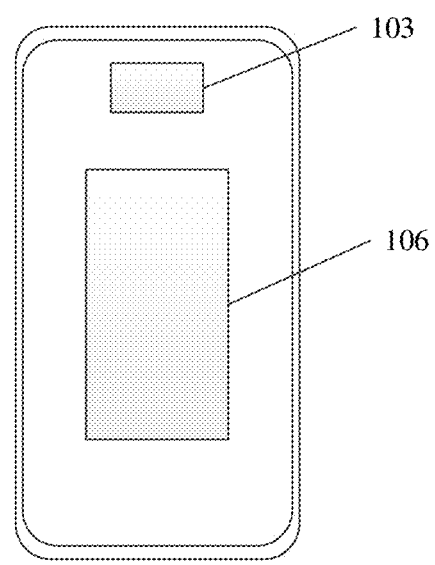
FIG. 10 is a schematic diagram of a terminal device according to an exemplary embodiment.

In some embodiments, as shown in FIG. 10, the terminal device may further include: a power supply module 106 disposed on the middle frame and configured to provide electric energy to a power consumption module in the terminal device. The first radiator 103 may be disposed between the power supply module 106 and the housing.

In the embodiments, the first radiator may be disposed between the power supply module and the housing, and the projection of the first radiator to the back shell of the housing may at least partially overlap the region in which the conducting layer is disposed. In other words, the conducting layer is not disposed at the position of projection of the power supply module to the back shell, but the conducting layer is disposed at the position of projection of the first radiator to the back shell. Therefore, electromagnetic energy on the first radiator can be better coupled to the conducting layer; and the interference of the electromagnetism generated by a power supply circuit of the power supply module on the second radiator can be reduced.

In some embodiments, the terminal device may further include: a circuit board; and a feed point on the circuit board. The first radiator may be connected with the feed point. The circuit board may include, but is not limited to, a printed circuit board (PCB).

The feed point may transmit an electric signal to the first radiator through a feed line, and the first radiator may radiate a wireless signal under the excitation of the electric signal. The received wireless signal may be converted into an electric signal, then the electric signal may be transmitted to the feed point through the first radiator, and the feed point may transmit the electric signal to the radio frequency module of the terminal device.

In some embodiments, the terminal device may further include: a radio frequency module disposed on the circuit board, and configured to provide a first signal to the first radiator through the feed point or receive a second signal formed by the first radiator based on the received wireless signal through the feed point.

In the embodiments, the radio frequency module is configured to receive or output electric signals and encoding and decoding signals. For example, the radio frequency module may include a first amplifier, an antenna switch, a filter component, a duplexer and a second amplifier. The first amplifier is configured to amplify electric signals in a signal output channel. The antenna switch is configured to realize switching between reception of the electric signals and transmission of the electric signals, and switching between different frequency bands of an antenna. The filter is configured to pass signals in a specific frequency band and filter out signals other than the specific frequency band. The duplexer is configured to isolate the transmitted electric signals from the received electric signals, so that the antenna can work normally when receiving and transmitting wireless signals simultaneously. The second amplifier is configured to amplify electric signals in a signal receiving channel. In this way, the reception and transmission of electric signals can be realized through the radio frequency module, so that the second radiator can receive and transmit wireless signals better.

In some embodiments, the back shell of the housing may be provided with a groove. The opening of the groove may face the first radiator. The conducting layer may be disposed in the groove. The shape of the groove may match the shape of the conducting layer. For example, when the conducting layer is rectangular, the groove may be set to be rectangular; and when the conducting layer is circular, the groove may be set to be circular. The size of the groove also needs to be matched with the size of the conducting layer. For example, the size of the groove is greater than or equal to the size of the conducting layer, which is not limited in the embodiments of the disclosure.

In the embodiments, the conducting layer may be installed by forming the groove in the back shell, and the conducting layer may also be directly disposed on the inner surface of the back shell without forming the groove. In order to realize the fixation of the conducting layer to the back shell, the conducting layer may be plated on the back shell by a laser direct irradiation technology or the conducting layer may be adhered to the back shell by gel, which is not limited in the embodiments of the disclosure.

In the embodiments, the conducting layer may be disposed in the groove in the back shell. Therefore, by disposing the conducting layer in the terminal device, the space occupied by the conducting layer in the terminal device can be reduced, and the efficiency of an antenna for receiving and transmitting wireless signals can be improved in a limited space.

Figure 11:
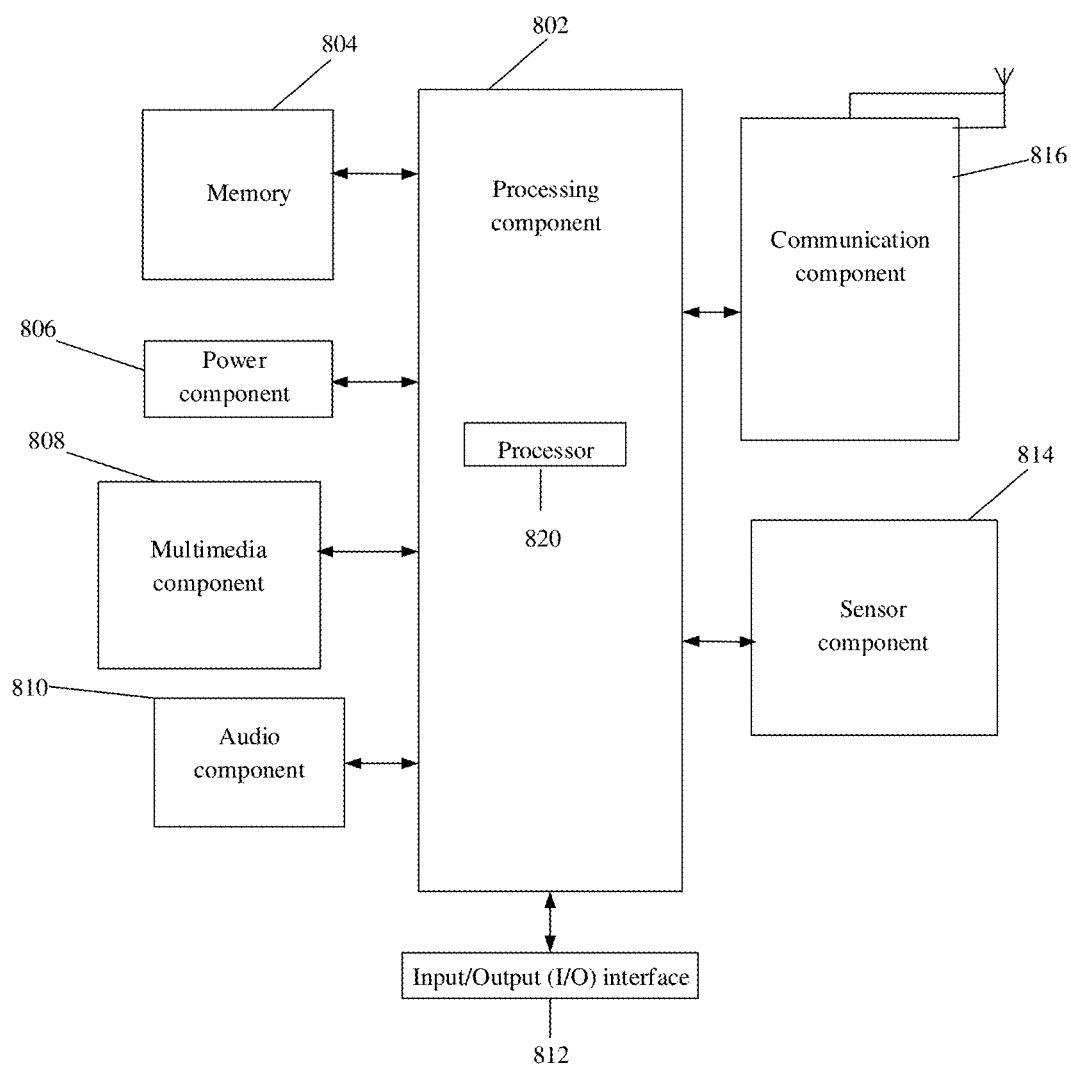
FIG. 11 is a block diagram of a terminal device according to an exemplary embodiment.

FIG. 11 is a block diagram of a terminal device according to an exemplary embodiment. For example, the terminal device may be a mobile phone, a computer, a digital broadcast terminal, a messaging device, a gaming console, a tablet device, a medical device, exercise equipment, a personal digital assistant, and the like.

Referring to FIG. 11, the terminal device may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the terminal device, such as operations associated with display, telephone calls, data communications, camera operations, and recording operations. The processing component 802 may include one or a plurality of processors 820 to execute instructions to complete all or part of the steps of the method described above. In addition, the processing component 802 may include one or a plurality of modules to facilitate the interaction between the processing component 802 and other components. For example, the processing component 802 may include a multimedia module to facilitate the interaction between the multimedia component 808 and the processing component 802.

The memory 804 is configured to store various types of data to support the operation of the terminal device. Examples of such data include instructions for any applications or methods operated on the terminal device, contact data, phonebook data, messages, pictures, video, etc. The memory 804 may be implemented by any type of volatile or non-volatile memory devices or combinations thereof, such as a Static Random Access Memory (SRAM), an Electrically Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic disk or a compact disk.

The power component 806 is configured to provide power to various components of the terminal device. The power component 806 may include a power management system, one or more power sources, and any other components associated with the generation, management and distribution of power in the terminal device.

The multimedia component 808 may include a screen providing an output interface between the terminal device and a user. In some embodiments, the screen may include a Liquid Crystal Display (LCD) and a Touch Panel (TP). If the screen includes the TP, the screen may be implemented as a touch screen to receive an input signal from the user. The TP may include one or more touch sensors to sense touch, swipe, and gestures on the TP. The touch sensors may not only sense a boundary of a touch or swipe action, but also detect a time of duration and a pressure associated with the touch or swipe action. In some embodiments, the multimedia component 808 may include a front camera and/or a rear camera. The front camera and/or the rear camera may receive external multimedia data while the terminal device is in an operation mode, such as a photographing mode or a video mode. Each front camera and each rear camera may be fixed optical lens systems or may have focal lengths and optical zoom capabilities.

The audio component 810 is configured to output and/or input audio signals. For example, the audio component 810 may include a Microphone (MIC) configured to receive external audio signals when the terminal device is in an operation mode, such as a call mode, a recording mode, and a voice recognition mode. The received audio signals may be further stored in the memory 804 or sent via the communication component 816. In some embodiments, the audio component 810 may further include a speaker configured to output audio signals.

The I/O interface 812 is configured to provide an interface between the processing component 802 and peripheral interface modules, such as a keyboard, a click wheel, or buttons. These buttons may include, but not limited to: a home button, a volume button, a start button, and a lock button.

The sensor component 814 may include one or more sensors to provide status assessments of various aspects of the terminal device. For example, the sensor component 814 may detect an open/closed status of the terminal device, and relative positioning of components. For example, the component is the display and the keypad of the terminal device. The sensor component 814 may also detect a change in position of the terminal device or a component of the terminal device, a presence or absence of user contact with the terminal device, an orientation or an acceleration/deceleration of the terminal device, and a change in temperature of the terminal device. The sensor component 814 may include a proximity sensor configured to detect the existence of nearby objects under the situation of no physical contact. The sensor component 814 may also include an optical sensor, such as a CMOS or CCD image sensor, for use in imaging application. In some embodiments, the sensor component 814 may further include an accelerometer sensor, a gyroscope sensor, a magnetic sensor, a pressure sensor, or a temperature sensor.

The communication component 816 is configured to facilitate wired or wirelessly communication between the terminal device and other devices. The terminal device may access a wireless network based on a communication standard, such as WiFi, 4G or 5G, or a combination thereof. In an exemplary embodiment, the communication component 816 receives broadcast signals or broadcast related information from an external broadcast management system via a broadcast channel In an exemplary embodiment, the communication component 816 may further include a Near Field Communication (NFC) module to facilitate short-range communications. In an exemplary embodiment, the communication component 816 may be implemented based on a Radio Frequency Identification (RFID) technology, an Infrared Data Association (IrDA) technology, an Ultra-Wide Band (UWB) technology, a Bluetooth (BT) technology and other technologies.

In exemplary embodiments, the terminal device may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic elements, for performing the above described methods.

Other embodiments of the disclosure will be apparent to those skilled in the art from consideration of the specification and practice of the disclosure herein. The disclosure is intended to cover any variations, uses, or adaptations of the disclosure following the general principles thereof and including such departures from the disclosure as come within known or customary practice in the art. It is intended that the specification and embodiments be considered as exemplary only, with a true scope and spirit of the disclosure being indicated by the following claims.

It will be appreciated that the disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A terminal device, comprising:
a housing;
a first radiator, disposed in the housing and configured to receive and transmit wireless signals; and
a conducting layer, disposed on an inner surface of a back shell of the housing, and coupled with the first radiator to form a second radiator that is configured to receive and transmit the wireless signals,
wherein the housing comprises a side frame, and
the conducting layer comprises at least two conducting regions disposed at intervals, the at least two conducting regions comprising a first conducting region and a second conducting region, a projection of the first radiator to the back shell of the housing at least partially overlaps a region in which the conducting layer is disposed,
wherein the first conducting region comprises a first side close to the side frame and a second side away from the side frame, a length of the first side being greater than a length of the second side; and
the second conducting region comprises a third side close to the side frame and a fourth side away from the side frame, a length of the third side being greater than a length of the fourth side.

2. The terminal device of claim 1, wherein
the first radiator comprises at least two radiation regions configured to receive and transmit at least two frequency bands; and
each of the at least two radiation regions in the first radiator is respectively coupled with a conducting region corresponding to the radiation region to receive and transmit wireless signals of the at least two frequency bands.

3. The terminal device of claim 2, wherein
the at least two radiation regions comprise a first radiation region and a second radiation region;
a projection of the first radiation region to the back shell of the housing partially overlaps the first conducting region; and
a projection of the second radiation region to the back shell of the housing partially overlaps the second conducting region.

4. The terminal device of claim 1, wherein the first conducting region is T-shaped, and the second conducting region is L-shaped.

5. The terminal device of claim 1, wherein
the side frame comprises a long edge and a short edge which are adjacent, and a length of the long edge is greater than a length of the short edge; and
a distance between the conducting layer and the long edge is less than a distance between the conducting layer and the short edge.

6. The terminal device of claim 1, wherein the conducting layer is formed by printing a conducting material on the back shell of the housing through a jig.

7. The terminal device of claim 6, wherein the conducting material comprises silver paste or copper.

8. The terminal device of claim 1, wherein the first radiator is a radiator formed by a laser direct irradiation molding process or a flexible circuit board process.

* * * * *